July 27, 1965
S. KRONENBERG
3,197,637
HIGH INTENSITY GAMMA INSENSITIVE NEUTRON DOSIMETER
Filed July 2, 1962
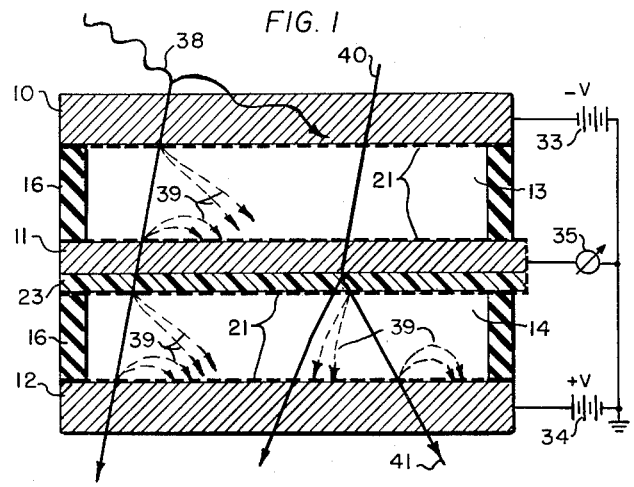
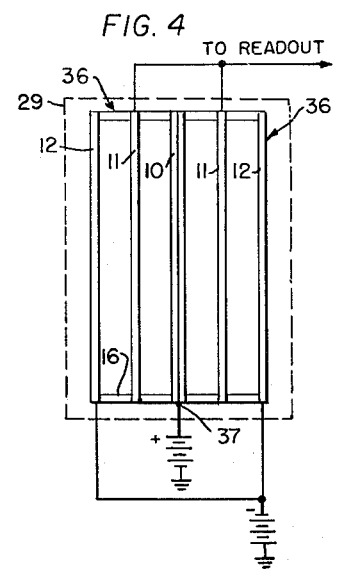
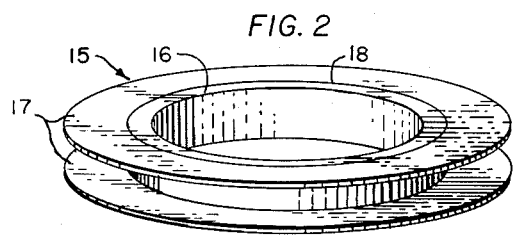
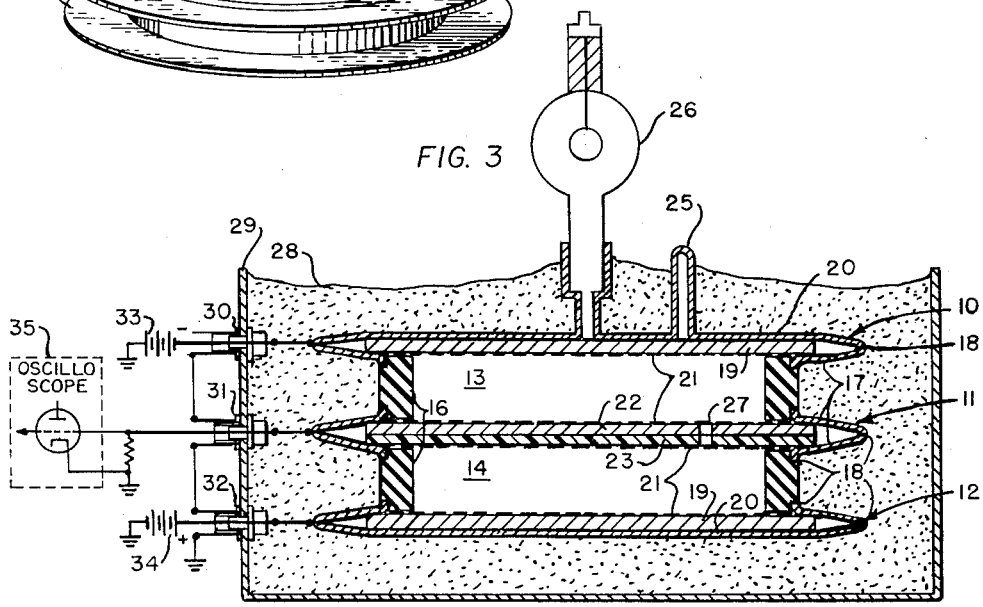
INVENTOR,
STANLEY KRONENBERG.
BY Harry M. Saragovitz
ATTORNEY.

United States Patent Office 3,197,637
Patented July 27, 1965

3,197,637
HIGH INTENSITY GAMMA INSENSITIVE NEUTRON DOSIMETER
Stanley Kronenberg, Skillman, N.J., assignor to the United States of America as represented by the Secretary of the Army
Filed July 2, 1962, Ser. No. 207,133
10 Claims. (Cl. 250—83.1)
(Granted under Title 35, U.S. Code (1952), sec. 266)

The invention described herein may be manufactured and used by or for the Government for governmental purposes, without the payment of any royalty thereon.

The invention relates to a neutron dose rate meter and particularly to such an instrument capable of discriminating against gamma rays in a high intensity mixed field of gamma rays and neutrons and which will provide a true indication of neutron flux or dose rate uninfluenced by gamma rays. Such indication having a time resolution of millimicroseconds.

The invention has a wide field of usefulness but is particularly valuable in pulsed nuclear-radiation research where mixed high intensity gamma rays and neutron fluxes are encountered that vary rapidly with time. Where such an environment is found two kinds of instruments must be utilized simultaneously to provide complete intensity data. One instrument records the gamma flux as a function of time and is insensitive to neutrons. The other instrument is a neutron dose rate meter which ignores gamma radiation. Both instruments must have a fast time resolution and must not saturate at very high intensities.

The present invention belongs in the latter class of instruments and is an accurate device for determining neutron flux densities of high intensity and with a high time resolution. The invention in certain of its aspects is similar to that presented in a copending application entitled High Intensity Dosimeter filed by the same applicant on September 22, 1959, bearing Serial No. 841,057, now abandoned.

Briefly the invention consists of three spaced parallel metallic plates, or equal area and disposed in registered alignment. The plates are electrically insulated from each other. One outer plate is charged negatively and the other positively. The center plate is faced on one side with neutron sensitive material and is electrically connected to a read out device such as an oscilloscope.

Neutrons incident upon the device will when reaching the neutron sensitive face of the center plate produce high energy charged particles which will escape from the plate and in so doing produce low energy secondary electrons in proportion to the incident neutron flux. The electrons are collected by the positively charged outer plate. Electric connections from the center plate to the read out device complete the output circuit. A sealed envelope structure provides for maintaining a high vacuum in the space between the plates.

A more detailed description of the construction and operation of the device including the manner in which the device discriminates against gamma particles will be set forth hereinafter.

It is a primary object of the invention to measure the intensity of neutrons.

A further object of the invention is to provide a device to measure the intensity of neutrons while discriminating against gamma rays in a mixed field of neutrons and gamma rays incident upon the device.

A further object of the invention is to provide a neutron intensity measuring device having a time response in millimicroseconds.

A further object of the invention is to provide a device of the type indicated which will function to measure very high neutron intensities without saturating.

A further object of the invention is to provide an intensity measuring device for neutron flux which is stable in operation and has a substantially linear response throughout its range.

Other objects and features of the invention will more fully appear from the following description and will be particularly pointed out in the claims.

To provide a better understanding of the invention particular embodiments thereof will be described and illustrated in the accompanying drawings wherein:

FIG. 1 is a diagrammatic drawing showing the paths of incident nuclear particles involved in the operation of the invention and the paths of resulting reactions products produced by the incident energy.

FIG. 2 is a detailed perspective view of an element of the structure of the device of the invention.

FIG. 3 is a cross section of a completed device embodying the invention.

FIG. 4 illustrates a form of the invention wherein two of the devices are arranged back to back to improve the directional characteristics of the system.

Any suitable peripheral shape for the device may be adopted. As shown, however, the device is made in the form of a circular disc composed of three flat spaced parallel plates 10, 11, and 12 which form separate vacuum chambers 13 and 14. The plates are of equal area and disposed in registered alignment. The outer plates constitute the top and bottom walls of the structure.

The diameter of the plates is not critical and may be approximately four and one half inches and the space between plates ¼ inch. The device must be carefully fabricated of materials suitable to maintain accuracy and consistency of operation. An example of a suitable construction is shown in the drawings. Other suitable structure within the spirit and scope of the appended claims may be followed.

As shown, the body of the device is made up basically of a pair of sub-assemblies 15 one of which is shown in FIG. 2 wherein a ring of insulation 16 constitutes the spacing means between the plates. On each assembly are secured rings 17 of metal. The rings are made to fit closely over the outer peripheral edges of the insulation 16, and are connected to the insulation at 18 by means of a metal to ceramic seal. The insulation is alumina ceramic or other suitable material. A disc of sheet aluminum 19 slightly larger than the insulation rings is placed upon one side of each assembly 15 and a disc of metal 20 having the same diameter as the rings 17 is placed upon the aluminum disc 19 and heliarc welded at its periphery to the periphery of the ring 17. While welding the members 17 and 20 they are drawn together to clamp the disc 19 in position. Before assembly the inner face of the aluminum disc is given a high polish and has evaporated thereon a thin layer of gold 21.

The two assemblies 15 are now joined but before doing so the center plate 11 is put in place. This plate is made up of an aluminum disc 22 and a superposed disc 23 of polished sheet Mylar or other hydrogenous material about one millimeter thick. The outer faces of the aluminum and Mylar are provided with an evaporated layer of gold 21. The discs 22 and 23 are placed between the two assemblies 15. To join the assembly the peripheral edges of adjacent rings 17 are drawn together and heliarc welded. Drawing the members 17 together clamps the discs 22 and 23 in position. The whole structure is thus hermetically sealed and rigidly fabricated.

A copper exhausting tube 25 is sealed into one of the Kovar plates 20 and if desired an ion pump 26 may also be permanently connected to the device having access to the chambers 13 and 14. The total evacuated space is physically separated into chambers 13 and 14 by the member 11. A small hole 27 is formed in the plate 11 to insure communication between the chambers. The chambers are pumped to a high degree of vacuum and the tube 25 is tipped off. The ion pump is useful for checking the condition of the vacuum and may also serve to maintain the desired vacuum.

It is imperative that the device be potted in a potting compound 28 which is received in a container 29. By completely surrounding the device in compound it is isolated from the surrounding air and thus avoids ionization chamber effects which would otherwise be present. To insure that there will be no moisture present in the chambers 13 and 14 the Mylar disc should be heated to about 150° C. before the gold is evaporated thereon and then assembled in the instrument. The gold layer should have a density of approximately .1 mg./cm.$^2$.

Electrical connections are made from the three plates 10, 11 and 12 to three coaxial cable hermetically sealed connectors 30, 31 and 32 secured in the wall of the container 29. The plate 10 is negatively charged by a battery 33 having a potential of approximately 300 volts and the plate 12 is charged positively to the same potential by the battery 34. A read out device such as an oscilloscope 35, shown diagrammatically, is connected to the center plate 11. Connections to the batteries and to the read out device are desirably made by coaxial cables the outer shields of which are connected to the common ground.

FIG. 4 illustrates diagrammatically a modified form of the invention wherein a pair of devices as above described are secured together back to back thereby to greatly enlarge the angular scope of the device. In this device units 36 are identical to the device described above and have their positively charged plates 10 secured together as by soldering and are connected to a common positive terminal 37. The outer plates 12 facing the direction of the incident radiation are negatively charged. The two middle plates 11 are connected together and to the read out device. The complete device may of course be fabricated as a unit, including all the elements shown in FIG. 4, but using a single plate when the two plates 10 are shown.

It should be pointed out that the plates 20 and 22 and the rings 17 may be made of any suitable electrically conductive material. The material for the rings 17 should be selected to provide good seals 18 with the insulation material from which the rings 16 are made.

In place of the gold above suggested for the layers 21 other metals may be used capable of producing an evaporated layer of satisfactory quality and uniformity. An important consideration in this respect is to provide a coating which is consistently uniform and reproducible to insure that all of the surfaces 21 are alike.

Hydrogenous material 23 has been suggested as a suitable material for producing recoil protons upon reaction with neutrons. However any suitable material may be used to produce high energy charged particles upon reaction with neutrons.

For the detection of fast neutrons either hydrogenous material or, for example, uranium 238 may be used. For detecting slow neutrons examples of suitable materials are uranium 235 or boron.

The sensitivity of the device may be enhanced by making the surface structure of all surfaces facing the vacuum from a high yield secondary electron emitter.

The basic principle upon which the device operates involves the phenomenon which takes place when fast particles such as Compton electrons and high energy protons or other charged particles pass through an interface between a solid and a vacuum. When this action takes place low energy secondary electrons are produced and enter the vacuum. The secondary electron current provides a measure of the incident flux intensity.

In the device of the invention the choice of materials and the arrangements of its component parts achieve results not heretofore obtainable.

The invention accurately measures only the intensity of neutrons incident thereon in a mixed environment of neutrons and gamma rays. The reaction of the device to gamma rays is such that electron current developed by these rays is neutralized to establish zero output at the read out device whereas neutrons incident on the device produce measurable secondary electron current in proportion to the flux intensity and this current is not neutralized or modified by the presence of gamma rays.

When gamma rays 38 are incident upon the plates 10, 11 and 12, Compton, photo or pair electrons, are produced which in turn produce secondary electrons 39 from the thin metallic film 21 upon the walls of the chambers 13 and 14 see FIG. 1. These surfaces are made identical and therefore the yield of secondary electrons, which depend only upon the structure of these surfaces, is the same in all directions. Since the voltages applied to the plates 10 and 12 are higher than the energy divided by the electron charge of the secondary electrons, the secondary electrons released by the primary particles are motivated by the applied voltages. Since the polarity of the applied voltages are as above described, the secondary electron current reaching the central plate 11 is the same as the outgoing current. The net current produced by the gamma radiation measured between this plate and ground approaches zero. Primary electrons present cannot be influenced by the applied voltage because of their high energy.

Neutrons 40 incident upon the device produce a different series of reactions which produce secondary electron current proportional to the intensity of the incident radiation. The two outer plates 10 and 12 contain no hydrogen or any material that would readily produce high energy particles which can contribute to the secondary electron current when reacting with neutrons. No high energy particles escape from these plates and therefore no low energy electrons 39 are produced. The central plate 11 however is made partially of hydrogenous material 23 and partially of a metal 22 such as aluminum. In this plate recoil protons 41 are produced some of which escape into the vacuum chamber 14. In other words secondary electrons leave the plate 23 and enter the chamber 14 where they are collected by the positively charged plate 12. An electric current is thus produced which is proportional to the incident neutron intensity. This current is not compensated by another current and can be measured by an external meter or by the oscilloscope 35.

In the system above set forth the fast neutrons will produce recoil atoms also in the plate material in the plates 10, 11 and 12. It can be shown, however, that because of their very short range the probability that they will cross into either vacuum chamber is very small and their contribution to the measured current is negligible. The system functions on secondary electrons alone and so eliminates problems of saturation from ion recombination making operation at very high dose rates possible.

What is claimed is:

1. A high intensity gamma insensitive neutron dose-rate-meter comprising three registered and spaced electrodes electrically insulated from each other, means to provide evacuated chambers formed by said electrodes, the two outer electrodes being made of electrically conductive material containing no hydrogen and the central electrode being made of nonhydrogenous electrically conductive material on one side and on its other side of material which produces high energy charged particles upon reaction with neutrons, means to charge one of said outer electrodes negatively and the other outer electrode positively, a read out device and an electrical connection from said central electrode to said read out device.

2. A high intensity gamma insensitive dose-rate-meter according to claim 1 and wherein all of the surfaces of said electrodes facing said vacuum chambers having evaporated thereon a very thin electrically conductive layer.

3. A high intensity neutron dose-rate-meter according to claim 1 and wherein said central electrode is composed of nonhydrogenous electrically conductive material on one side and fissionable material on its other side.

4. A high intensity neutron dose-rate-meter according to claim 1 and wherein said central electrode is made of nonhydrogenous material on one side and hydrogenous material on its other side.

5. A high intensity neutron dose-rate-meter comprising three spaced, parallel electrically conductive plates of equal area and arranged in registered relationship, combined spacing and insulating members between the plates and sealed to the outer periphery thereof to form hermetically sealed vacuum chambers between said plates, said chambers having a high vacuum therein the outer plates being made of nonhydrogenous metal while the central plate is made of nonhydrogenous metal on one side and of material which produces high energy charged particles upon reaction with neutrons on its other side, means to charge one of said outer plates negatively and the other outer plate positively, a read out device and an electrical connection from said central electrode to said read out device.

6. A high intensity neutron dose-rate-meter according to claim 5 and wherein the said neutron reactive material is hydrogenous material.

7. A high intensity neutron sensitive dose-rate-meter according to claim 5 and wherein the surfaces of all the plates facing vacuum are all polished to provide very smooth equivalent surfaces and have evaporated thereon a very thin uniform layer of electrically conductive metal the said layer being substantially .1 mg./cm.$^2$ in density.

8. A high intensity neutron dose-rate-meter according to claim 5 and a container surrounding the device having potting compounded therein operative to exclude air from the outer surfaces of the device.

9. A high intensity neutron dose-rate-meter according to claim 5 and wherein the said neutron reactive material is uranium 235.

10. A high intensity neutron dose-rate-meter according to claim 5 and wherein the said neutron reactive material is boron.

References Cited by the Examiner

UNITED STATES PATENTS

| 2,595,622 | 5/52 | Wiegand | 250—83.1 |
| 2,962,614 | 11/60 | Weill | 313—61 |
| 3,013,156 | 12/61 | Hearn | 250—83.6 |

FOREIGN PATENTS 888,879 2/62 Great Britain.

RALPH G. NILSON, *Primary Examiner.*